Sept. 30, 1969  E. M. GLAROS  3,469,788

AIRLESS SPRAY APPARATUS AND METHODS

Filed March 14, 1966  2 Sheets-Sheet 1

INVENTOR
EMANUEL MICHAEL GLAROS

Sept. 30, 1969  E. M. GLAROS  3,469,788
AIRLESS SPRAY APPARATUS AND METHODS
Filed March 14, 1966  2 Sheets-Sheet 2

INVENTOR
EMANUEL MICHAEL GLAROS

United States Patent Office 3,469,788
Patented Sept. 30, 1969

3,469,788
AIRLESS SPRAY APPARATUS AND METHODS
Emanuel Michael Glaros, 240 Cascade Road,
Pittsburgh, Pa. 15221
Filed Mar. 14, 1966, Ser. No. 534,224
Int. Cl. B05b *11/00, 7/32*
U.S. Cl. 239—307         8 Claims

ABSTRACT OF THE DISCLOSURE

A high pressure spray apparatus is provided having a pressure vessel, an outlet communicating with the lowest point in the pressure vessel, a spray nozzle connected to the outlet, a liquid suspension of material to be sprayed within the vessel, a high pressure compressible immiscible fluid in contact with the liquid suspension and means for replacing said liquid suspension to be sprayed without loss of such high pressure fluid.

---

This invention relates to airless spray apparatus and methods and particularly to the spray application of paints, coatings and other sprayable materials by the so-called airless spray method which permits, by the use of very high fluid pressures, the breakup of the paint stream at the nozzle tip into a fine spray pattern without the need for atomization of the paint particles by use of compressed air or gas injected separately into the paint stream at the nozzle or contained in the paint stream as by conventional air spraying or aerosol spray cans. More particularly, this invention relates to such airless spray application by use of the kinetic energy of gas under very high pressures to induce the necessary hydraulic pressure to the fluid materials, presently imparted to the fluids in airless spray applications by use of very expensive and complicated hydraulic pumps powered by electric motors, gasoline engines and compressed air produced by expensive air compressors.

Conventional air spraying relies for its effectiveness upon atomization of paint particles by the introduction of compressed air into the paint stream at the nozzle of the spray gun. This requires the use of a compressor, and, in the case of large jobs an attending engineer for the compressor.

Aerosol spray cans have been used for some time for small jobs. They, like conventional air spraying, rely upon atomization of the paint particles by release of compressed gas into the stream at the nozzle. This is accomplished by using a miscible liquefied gas with the paint so that a large part of the gas is in liquid solution with the paint suspension and the pressure is about 30-35 p.s.i. When the mixture leaves the nozzle of the aerosol can, the liquid gas expands rapidly, atomizing and propelling the paint particles.

My invention, in contrast with present airless spraying equipment, involves no costly complicated mechanical moving parts except for the spray gun trigger and valves and pressure regulators for the more sophisticated and automated models of my invention. The most simplified form of my invention involves the use of a single high pressure cylinder containing both the material to be sprayed and the high pressure immiscible gas which provides the hydraulic pressure to the material for airless spraying through a spray nozzle attached to the one end of the cylinder. My invention further encompasses the use of a cylinder or cylinders containing high pressure gas to provide the necessary hydraulic airless spraying pressure to the fluid or fluids contained in a separate high pressure cylinder or cylinders to which are connected an airless spray gun or guns. Furthermore, a multiple component material involving two or more components, such as epoxy coatings, polyurethane foam, and other catalyzed materials may be applied and properly metered by the use of one or more cylinders containing high pressure gas to provide the necessary and regulated hydraulic pressure to each of the necessary components, each of which is contained in separate high pressure cylinders which are in turn connected to a common gun for mixing and application, either by spraying or by pouring.

Preferably, I provide a pressure vessel, an outlet in said pressure vessel communicating with the lowest point in the pressure vessel, a liquid suspension of material to be sprayed in said pressure vessel, a high pressure fluid in contact with the liquid paint suspension and nozzle means connected to said outlet for forming a film of liquid paint suspension when said suspension passes therethrough under pressure. The high pressure fluid is a gas substantially immiscible in the paint suspension and preferably at a pressure exceeding about 500 p.s.i. at all times.

The invention may be embodied in various means such as, for example:

(1) A single bottom outlet cylinder, with spray nozzle attached, containing both the high pressure gas and the material to be sprayed;

(2) A single top outlet cylinder, with spray nozzle attached to material tube, containing both the high pressure gas and the material to be sprayed;

(3) A single bottom outlet cylinder containing both the high pressure gas and the material to be sprayed, with a spray gun attached to the bottom outlet by use of flexible tubing;

(4) A single top outlet cylinder containing both the high pressure gas and the material to be sprayed, with a spray gun attached to a material tube in the tank by use of flexible tubing;

(5) A cylinder or cylinders containing only high pressure gas connected to the top inlet of a cylinder or cylinders containing the material to be sprayed, with a spray gun attached to the bottom outlet of the material cylinder by use of flexible tubing;

(6) A cylinder or cylinders containing only high pressure gas connected to the top inlet of a cylinder or cylinders containing the material to be sprayed, with a spray gun attached to the top outlet of a material tube in the material cylinder by use of a flexible tubing;

(7) A cylinder or cylinders containing only high pressure gas connected to the top inlet of two or more bottom outlet material cylinders, all of which may contain the material to be sprayed, or one may be reserved to contain a solvent or cleaning compound for cleaning the flexible tubing and spray gun in the event that one and the same spray gun is to be transferred and used with each of the material tanks;

(8) A cylinder or cylinders containing only high pressure gas connected to the top inlet of two or more top outlet material cylinders, all of which may contain the material to be sprayed, or one may be reserved to contain a solvent or cleaning compound for cleaning the flexible tubing and spray gun in the event that one and the same spray gun is to be transferred and used with each of the material tanks;

(9) A continuous manual to fully automatic production type of spraying unit in which the "spent" compressed gas is either exhausted or partially used for delivery of paint to the unit through a low pressure material supply line. This unit consists of a cylinder or cylinders containing only high pressure gas connected by tubing and through a pressure regulator and a series of valves to the top inlet of two or more bottom outlet material cylinders, each of which may be setting on or encompass a weight detection device or liquid level detection device; to determine the need for the beginning and the stopping of the refilling operation for each of the material cylinders; the bottom outlet of each of these two material tanks being connected by tubing and a series of valves alternately to either a material supply line for refilling of the material tank or to the spray gun or guns for spray application of the material;

(10) A continuous manual to fully automatic production type of spraying unit in which the "spent" compressed gas is never exhausted or lost, but is recharged by being forced back into the compressed gas cylinder from the material cylinders by the refilling of the "spent" material cylinders from a high pressure material supply line. This unit consists of a cylinder or cylinders containing only high pressure gas connected by tubing, through a pressure regulator, and a series of valves to the top inlet of two or more bottom outlet material cylinders, and also connected to the same two material cylinders by means of by-pass tubing and valves for the return of the "spent" gas from the material cylinders to the gas cylinder. Each of these material cylinders may be setting on or encompass a weight detection device or a liquid level detection device to determine the need for the beginning and the stopping of the refilling operation for each of the material cylinders; the bottom outlet of each of these two material tanks being connected by tubing and a series of valves alternately to either a high pressure material supply line for refilling of the material tank or to the spray gun or guns for spray application of the material;

(11) A continuous manual to fully automatic production type of spraying unit consisting of one or more cylinders, each of which contains both high pressure gas and the material to be sprayed, and in which unit the "spent" compressed gas in each cylinder is never exhausted or lost, but is rather repressurized in the same cylinder by the refilling of the cylinder from a high pressure material supply line. Each of these cylinders may be setting on or encompass a weight detection device or a liquid level detection device or a high and low pressure detection and activating device to determine the need for the beginning and the stopping of the refilling operation for each of the cylinders; the bottom outlet of each cylinder being connected by tubing and a series of valves alternately to either a high pressure material supply line for refilling of the cylinder or to the spray gun or guns for spray application of the material;

(12) A continuous manual to fully automatic production type of spraying and pouring unit for the application of multiple component materials such as epoxy and polyurathane foam, in which the "spent" compressed gas is either exhausted or used for delivery of the material components to the unit through low pressure material supply lines. This unit consists of a cylinder or cylinders containing only high pressure gas connected by tubing and through a pressure regulator and a series of valves to the top inlet of each of the two or more bottom outlet material cylinders, each of which may be setting on or encompass a weight detection device or liquid level detection device to determine the need for the beginning and the stopping of the refilling operation for each of the material cylinders; the bottom outlet of each of these two or more material cylinders being connected by tubing and a series of valves alternately to either a material supply line for refilling or to the spray or mixing gun for spray application or pouring of the mixed material. For continuous uninterrupted operations at least two material cylinders would be required for each of the component materials to permit changeover from an almost empty cylinder to a full cylinder without stopping the flow of material to the gun. This unit can be rearranged so that the "spent" compressed gas is never exhausted or lost, but is recharged by being forced back into the compressed gas cylinder from the material cylinders by the refilling of the "spent" material cylinders from a high pressure material supply line, by a system of tubing and valving;

(13) A cylinder or cylinders containing only high pressure gas connected to a cylinder or cylinders containing an abrasive material such as sand or steel shot, with a blasting nozzle attached to the materials cylinder by use of flexible tubing;

(14) Any of the above embodiments may be used for the delivery of any material to an airless spray gun, a mixing chamber for pouring, or for abrasive cleaning through a blasting nozzle;

(15) My invention further includes in the above embodiments the accurate control of the gas and in turn the fluid pressure or material pressure by the use of pressure regulator valves as needed. Furthermore, the gas pressure and in turn the material pressure may be further controlled as necessary in each application by the use and control of external heat applied to the combination gas and air cylinder as well as to the individual gas cylinder and individual material cylinders by emersion into a hot water bath, by electrical resistant heating, or by any other external heating method. Where the application of external heat becomes necessary, the efficiency of the unit may be enhanced by the proper application of insulating materials to better retain and control the heat level. This inclusion in my invention is intended to take advantage of the effect that an increase in temperature has in increasing gas pressures which in turn would increase material pressures, and the effect of increased temperature in decreasing the viscosity of fluid materials which in turn reduces the pressure required to move the fluid through tubing, nozzles and other restrictions, all of which would effect a more efficient utilization of my invention;

(16) My invention further includes in the above embodiments the continual re-use of all cylinders by cleaning, when necessary, and refilling as outlined below:

(a) For all combination cylinders containing both compressed gas and material, the "spent" cylinder may be completely emptied of all paint and all gas and refilled with new paint and new gas; or the spent cylinder may be refilled with the same type and color of material from a high pressure material delivery line or source without exhausting or wasting the power of the compressed gas contained in the cylinder; or the spent cylinder may be filled with a different type or color of material by first exhausting all the old material but not the gas, then injecting solvent or chemical cleaner under high pressure into the cylinder for cleaning out, and then exhausting only the dirty solvent but none of the gas, repeating this operation until the cylinder is satisfactorily cleaned and exhausted of all solvent but none of the gas, and then finally refilled to the proper level with the new material delivered under high pressure from a high pressure material delivery line or source.

(b) The spent cylinders containing only compressed gas will be refilled to the desired gas pressure by conventional means.

(c) The spent gas contained in the materials cylinders may be returned to the compressed gas cylinder by the refilling of the "spent" material cylinders from a high pressure material supply line or source, thus, forcing the gas back into the compressed gas cylinder until it attains its beginning high pressure more or less.

(d) The "spent" material cylinders may be completely emptied of all paint and all gas and be refilled with new paint and new gas; or the spent cylinder may be refilled with the same type and color of material from a high pressure material delivery line or source without exhausting or wasting the power of the compressed gas contained in the cylinder by forcing this gas back into the compressed gas cylinder; or the spent cylinder may be filled with a different type or color of material by first exhausting all the old material but not the gas, then injecting solvent or chemical cleaner under high pressure into the cylinder for cleaning out, and then exhausting only the dirty solvent but none of the gas, repeating this operation until the cylinder is satisfactorily cleaned and exhausted of all solvent but none of the gas, and then finally refilling to the proper level with the new material delivered under high pressure from a high pressure delivery line or source, thus forcing the gas back into the compressed gas cylinder, now recharged for reuse.

The foregoing general description of my invention sets out certain objects, advantages and purposes which may be achieved. Other objects, advantages and purposes of this invention will be apparent from a consideration of the following description and the accompanying drawings, in which.

Figure 1:
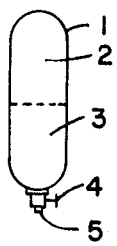
FIGURE 1 is a side elevation of a single bottom outlet cylinder for both high pressure gas and material to be sprayed.

Referring to the drawings, I have illustrated in FIGURE 1, a single bottom outlet cylinder 1, containing both high pressure gas 2 in the upper portion and the material 3 to be sprayed in the lower portion, with high pressure valve 4 attached to bottom outlet of cylinder 1, to which is attached an airless spray nozzle 5. When valve 4 is opened the compressed gas 2 will force the material 3 through valve 4 and finally through nozzle 5 for airless spray application of material.

Figure 2:
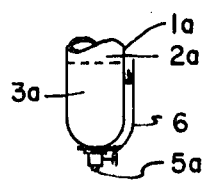
FIGURE 2 is a fragmentary side elevation of the cylinder of FIGURE 1 having a second embodiment of valve structure.

FIGURE 2 is similar to FIGURE 1 except that valve 4 in FIGURE 1 is now replaced by a quick acting triggering type of valve 6.

Figure 3:
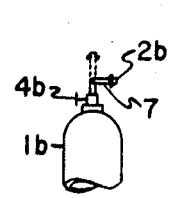
FIGURE 3 is a fragmentary side elevation of a top outlet cylinder for high pressure gas and material to be sprayed with a 90° swivel nozzle.

FIGURE 3 shows the use of a 90° swivel joint 7 attached to compressed gas and material cylinder 1b through valve 4b. This permits the application of the sprayed material in a 90° range from vertical to horizontal for the units such shown in FIGURES 1, 2, 4 and 5.

Figure 4:
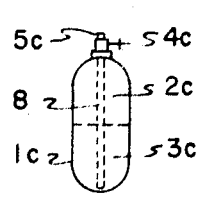
FIGURE 4 is a side elevation of a top outlet cylinder for high pressure gas and material to be sprayed.

FIGURE 4 illustrates a single top outlet cylinder 1c containing both the high pressure gas 2c in the upper portion and the material 3c to be sprayed in the lower portion. When valve 4c is opened the compressed gas 2c will force the material 3c into the bottom of material tube 8, through tube 6 and valve 4c and finally through nozzle 5c for airless spray application of material.

Figure 5:
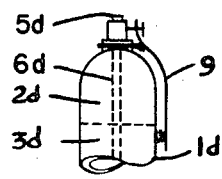
FIGURE 5 is a fragmentary side elevation of a cylinder such as shown in FIGURE 4 with a quick action trigger valve.

FIGURE 5 is similar to FIGURE 4 except that valve 4d in FIGURE 4 is now replaced by a quick acting triggering type valve 9 in FIGURE 5.

Figure 6:
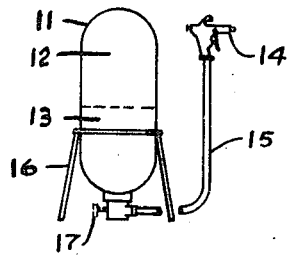
FIGURE 6 is a further embodiment of the cylinder of FIGURE 1 having a flexible hose and nozzle.

FIGURE 6 illustrates a single bottom outlet cylinder 11 containing both the high pressure gas 12 in the upper portion and the material 13 to be sprayed in the lower portion with a spray gun 14 attached to the bottom outlet of cylinder 11 by use of flexible tubing 15. Cylinder 11 is positioned in a supporting stand 16 which may rest on the floor or other base. When spray gun 14 is triggered to start the spray operation, the compressed gas 12 will force the material 13 through the bottom outlet of cylinder 11, through the flexible tubing 15 and in turn through the spray nozzle of spray gun 14. In an alternate construction, a high pressure valve 17 is included at the bottom outlet of cylinder 11 to permit the shut-off of material flow out of cylinder 11 in the event that spray gun 14 and flexible tubing 15 must be removed for cleaning or other purposes. This high pressure valve is optional.

Figure 7:
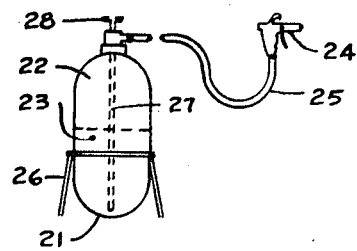
FIGURE 7 is a further embodiment of the cylinder of FIGURE 4 having a flexible hose and nozzle.

FIGURE 7 provides a top outlet cylinder 21 containing both a high pressure gas 22 in the upper portion and the material 23 to be sprayed in the lower portion, with spray gun 24 attached by way of flexible tubing 25 to the top outlet of material tube 27 which extends to the bottom of cylinder 21. Cylinder 21 is positioned in a supporting stand 26 which may rest on the floor or other base. When spray gun 24 is triggered to start the spray operation, the compressed gas 22 will force the material 23 into the bottom of material pick-up tube 27, through tube 27 and through flexible tubing 25 and in turn through the spray nozzle of spray gun 24. Here again an optional high pressure valve 28 is included at the top outlet of cylinder 21 to permit the shut off of material flow out of cylinder 21 in the event that spray gun 24 and flexible tubing 25 must be removed for cleaning or other purposes.

Figure 8:
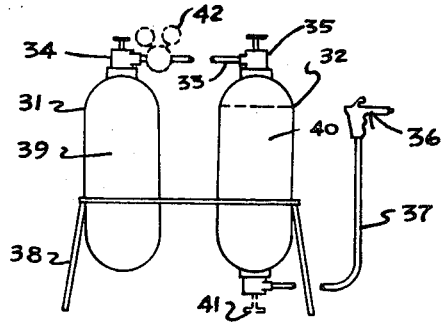
FIGURE 8 is a side elevation of an embodiment of my invention using side-by-side gas and material cylinders.

FIGURE 8 illustrates a high pressure cylinder 31 containing only high pressure gas 39, connected by way of tubing 33 to the top inlet of high pressure cylinder 32 containing material 40 to be sprayed in the lower portion and gas 39 in the upper portion, with a spray gun 36 attached to the bottom outlet of material cylinder 32 by use of flexible tubing 37. Cylinders 31 and 32 are positioned in a supporting stand 38 which may rest on the floor or other base. When spray gun 36 is triggered to start the spray operation, the compressed gas 39 will flow through valve 34, tubing 33 and valve 35 into material tank 32 thus forcing the material 40 through the bottom outlet of material cylinder 32, through the flexible tubing 37 and in turn through the spray nozzle of spray gun 36. A high pressure valve 42 may be included in the bottom outlet of material cylinder 32 to permit the shut off of material flow out of material cylinder 32 in the event that spray gun 36 and flexible tubing 37 must be removed for cleaning or other purposes. Optionally, a high pressure regulating valve 42 is included at the outlet of compressed gas cylinder 31 to permit the regulation and control of the gas pressure flowing through the regulator 42, through the tubing 33, gas valve 35, and into the top portion of material cylinder 32. The regulated gas pressure flowing through regulator 42 in turn controls the rate of flow of material 40 through spray gun 36, offering a uniform rate of flow of material through the nozzle of spray gun 36 and a consistency of spray pattern for the entire period from the full position to the empty position of the material 40 in material cylinder 32.

Figure 9:
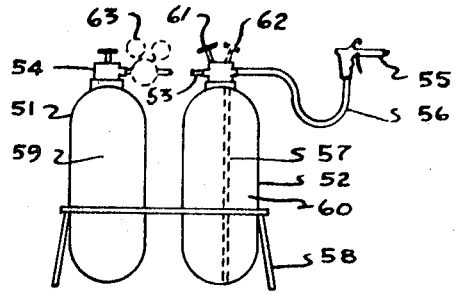
FIGURE 9 is a further modification of the embodiment of FIGURE 8.

FIGURE 9 shows a high pressure cylinder 51 containing only high pressure gas 59, connected by way of tubing 53 to the top gas inlet of high pressure cylinder 52, containing material 60 in the lower portion and gas 59 in the upper portion above material 60, with spray gun 55 attached by way of flexible tubing 56 to the top outlet of material tube 57 which extends to the bottom of material cylinder 52. Cylinders 51 and 52 are positioned in a supporting stand 58 which may rest on the floor or other base. When spray gun 55 is triggered to start the spray operation, the compressed gas 59 will flow out of cylinder 51 through valve 54, tubing 53, and gas valve 61, and into the top of material cylinder 52, thus forcing the material 60 into the bottom of material tube 57, through material tube 57, flexible tubing 56, and in turn through the spray nozzle of spray gun 55. A high pressure valve 62 may be included at the top outlet of material tube 57 to permit the shut off of material flow out of material cylinder 52 in the event that spray gun 55 and flexible tubing 56 must be removed for cleaning or other purposes. Optionally, a high pressure regulating valve 63 is included at the outlet of compressed gas cylinder 51 to permit regulation and control of the gas pressure flowing through regulator 62, through tubing 53, gas valve 61 and into the top portion of material cylinder 52. The regulated gas pressure flowing through regulator 63 in turn controls the rate of flow of material 60 through spray gun 55, offering a uniform rate of flow of material through the nozzle of spray gun 55 and a consistency of spray pattern for the entire period from the full position to the empty position of the material 60 in material cylinder 52.

Figure 10:
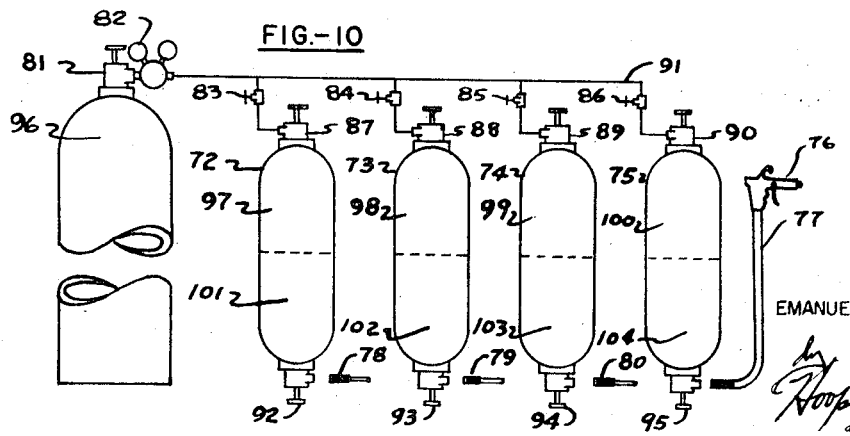
FIGURE 10 is a side elevation of an embodiment of my invention incorporating a single gas cylinder and a multiplicity of material cylinders.

FIGURE 10 illustrates a high pressure cylinder 71 containing only high pressure gas 96 connected by way of tubing 91, valve 81, pressure regulator 82, and valves 83, 84, 85, 86, 87, 88, 89 and 90 to the top inlet of material cylinders 72, 73, 74 and 75, each of which contains, respectively, material 101, 102, 103 and 104 in the lower portion and regulated compressed gas 97, 98, 99 and 100 in the upper portion. Each of the material cylinders 72, 73, 74 and 75 has attached to its bottom outlet a high pressure material valve, respectively, 92, 93, 94 and 95. The spray gun 76 connected to flexible tubing 77 may be used with any one of the four material cylinders 72, 73, 74 and 75 by attaching flexible tubing 77 to any one of the bottom outlet valves 92, 93, 94 and 95. Each of the material tanks 72, 73, 74 and 75 may have its own spray gun and flexible tube attachment by connecting flexible tubing 8 with spray gun attached to valve 92, flexible tubing 79 with spray gun attached to valve 93, flexible tubing 80 with spray gun attached to valve 94, and flexible tubing 77 with spray gun 76 attached to valve 95. Material tanks 72, 73, 74 and 75 may each contain a different type and color of material. If one spray gun 76 with flexible tubing 77 is to be used alternately for each of the four material cylinders 72, 73, 74 and 75, the one material cylinder, say 75, may be reserved for filling with a solvent or cleaning compound to permit the cleaning of flexible tubing 77 and spray gun 76, before transferring from one material cylinder to another. Assuming that spray gun 76 and flexible tubing 77 is the only spray gun and flexible tubing available and that it is attached to bottom outlet valve 92 of material cylinder 72, then as spray gun 76 is triggered to start the spray operation, the compressed gas 96 will flow out of cylinder 71, through valve 81, through pressure regulator 82 where it is reduced to the required pressure, through tubing 91, through valve 83, valve 87, and into the top of material cylinder 72, thus forcing the material 101 through valve 92, flexible tubing 77 and in turn through the spray nozzle of spray gun 76. The same procedure would be used if this single spray gun 76 and flexible tubing 77 were attached to valve 95, of say, cylinder 75, containing solvent or cleaning compound for cleaning of the flexible tubing and spray gun before removal and attachment to any of the other two material cylinders 73 or 74, for a similar procedure of spraying. If additional spray guns and flexible tubing units are available, any two, any three, or all four of the material cylinders 72, 73, 74 and 75 may be used simultaneously for spraying as outlined above.

Figure 11:
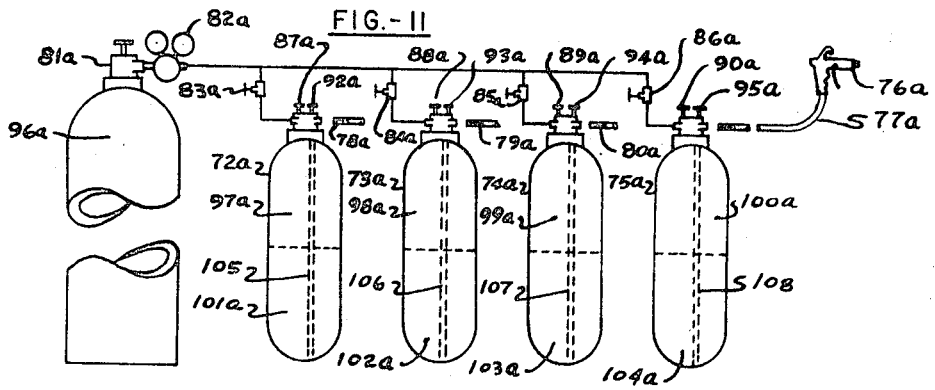
FIGURE 11 is a modification of the embodiment of FIGURE 10.

FIGURE 11 is similar to FIGURE 10 except that material cylinders 72a, 73a, 74a and 75a in FIGURE 11 have a top inlet for gas as well as a top material outlet through valves 92a, 93a, 94a and 95a, which are connected, respectively, to the top of the material tubes 105, 106, 107 and 108, each of which extends to the bottom of material cylinders 72a, 73a, 74a and 75a. The operating procedure for the unit shown in FIGURE 11 is similar to that of the unit shown in FIGURE 10, except that the material 101a, 102a, 103a and 104a must now be forced by the compressed gas 97a, 98a, 99a and 100a to enter the bottom of the material tubes 105, 106, 107 and 108, and must travel through these material tubes to reach valves 92a, 93a, 94a and 95a, and thus through the flexible tubing and spray nozzle of the spray gun.

Figures 12, 13:
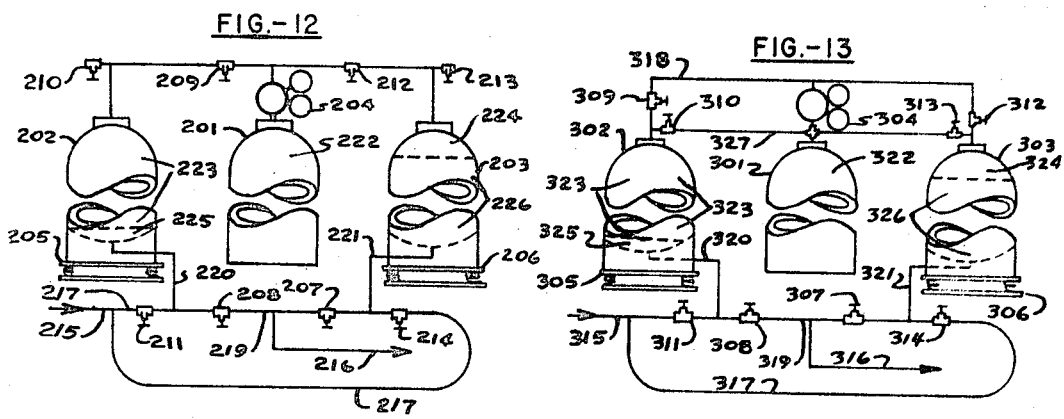
FIGURE 12 is a schematic embodiment of my invention showing a continuous manual to fully automatic spraying unit.
FIGURE 13 is a modification of the embodiment illustrated in FIGURE 12.

FIGURE 12 illustrates still another form of a continuous manual to fully automatic production type of spraying unit consisting of a high pressure cylinder 201 containing only high pressure gas 222, connected by way of tubing 218, pressure regulator 204, and valves 209 and 212 to the top inlet of high pressure material cylinders 202 and 203, each of which contains, respectively, material 225 and 226 in the lower portion and regulated compressed gas 223 and 224 in the upper portion. The bottom outlet of each of the material cylinders 202 and 203 is connected, respectively, by tubing 220 and 221 to tubing 219, respectively, through valve 208 and valve 207, which tubing 219 leads to the spray guns 216. The bottom outlet of each of the material cylinders 202 and 203 is also connected respectively, by tubing 220 and 221 to tubing 217, respectively, through valves 211 and 214, which tubing 217 leads to material supply line 215. Material cylinder 202 is setting on level detecting device 205 and material cylinder 203 is setting on level detecting device 206, the purpose of both level detecting devices being to determine the need for the beginning and the stopping of the refilling operation for each of the material cylinders 202 and 203. Valves 210 and 213 connected to material cylinders 202 and 203 by way of tubing 218 serve the purpose of exhausting the compressed gas, respectively, 223 and 224 before the material refilling operation can be commenced for each of the material cylinders 202 and 203. In the following operational procedure, it is assumed that the level detecting device 205 has just indicated that the level of material 225 in material cylinder 202 has just reached the point at which the refilling of material cylinder 202 must be commenced. Up to and including this instant, the spray guns 216 were being fed material 225 out of material cylinder 2 through tubing 220 and 219 and open valve 208; with valve 210 closed, valve 209 open, valve 211 closed, valve 212 open, valve 213 closed, valve 207 closed and valve 214 closed. Now, immediately before starting the refilling operation for cylinder 202, valve 207 is opened to start the feeding of material 226 out of cylinder 203 through tubing 221, through valve 207, and tubing 219 and on to spray guns 216. Then, valve 208 is closed to stop the flow of material 225 to the spray guns 216; close valve 209 to stop the flow of regulated compressed gas into material cylinder 202; open valve 210 to bleed the compressed gas 223 out of material cylinder 202; open valve 211 to feed new material from material supply source 215 through tubing 217, valve 211, and tubing 220 to raise the level of material 225 in material cylinder 202, which filling operation will continue until the level detecting device 205 indicates that the material 225 has reached the maximum permissable level of filling in cylinder 202; at this instant, valve 211 is closed to stop further flow from the material supply line 215 into cylinder 202; valve 210 is closed to prevent the further exhausting of gas 223 out of cylinder 202; valve 209 is opened to permit the passage of compressed gas 222 through pressure regulator 204, valve 209, and tubing 218 and on into the top of material cylinder 202, so that now, material cylinder 202 will be ready for use, filled with material 225 and pressurized with regulated gas 223. Now, when level detecting device 206 indicates that the level of material 226 has reached the low level which indicates the need for refilling of cylinder 203, a similar opening and closing of valves will follow as outlined above for the refilling of cylinder 202, that is, open valve 208, close valve 207, close valve 212, open valve 213, open valve 214, and when level detecting device 206 indicates material cylinder 203 is filled with material 226 then close valve 214, close valve 213, and open valve 212. The spraying unit now is in the starting position. The compressed gas 223 and 224 exhausted through valves 210 and 213 respectively may be partially used for delivery of paint to the spraying unit by pressurizing low pressure paint containers which in turn would feed into the material supply line 215. The entire spraying unit in this FIGURE 12 can be either completely manually operated to offer continuity of flow of material to the spray guns 216; part manually and part automatically; or completely automatic by the use of automatically controlled valves sequentially opened and closed by electrical impulses relayed by the level detecting devices 205 and 206; or all the automatic controls and valves may be pneumatic, perhaps by use of the compressed gas 223 and 224 exhausted through valves 210 and 213, by connecting valves 210 and 213 to a low pressure gas cylinder which will maintain the necessary pressure and volume of gas to operate the pneumatic controls; or complete automation can be arranged by a combination of pneumatic and electric controls. It is obvious that continuity of flow of material to spray guns 216 at proper spraying pressures cannot continue beyond the point when the pressure of gas 222 in gas cylinder 1 becomes equal to the desired regulated pressure of gas 223 and 224 in material cylinders 202 and 203 respectively. It is further obvious that the time of continued flow of material to spray guns 216 can be increased to the desired limit of continuous uninterrupted operations by increasing the size of cylinder 201 as necessary or by connecting a series of compressed gas cylinders. Of course, it is assumed that the source of the material supply line 215 will be continuous, as necessary. One material supply source 215 can supply many spraying units such as shown in FIGURE 12, limited in number only by the capacity of material source 215 as compared to the rate of material use by the spray units. The flow pressure necessary for material source 215 can be furnished by gravity flow of new materials or any other convenient and applicable means.

FIGURE 13 illustrates a continuous manual to fully automatic production type of spraying unit, similar to the unit shown in FIGURE 12, except that in the unit in FIGURE 13, the "spent" compressed gas 323 and 324 is never exhausted or lost, but is recharged or repressurized by being forced back into the compressed gas cylinder 301 from the material cylinders 302 and 303 by the refilling of the spent material cylinders 302 and 303 with material 325 and 326 from a material supply line 315 which has a delivery pressure slightly higher than a newly charged gas cylinder 301. Gas 323 in material cylinder 302 is forced back into compressed gas cylinder 301 by the rising level of material 325 forcing gas 323 through the top outlet of material cylinder 302 through valve 310, through tubing 327 and into cylinder 301, with both valves 309 and 313 closed; and gas 324 is forced by rising material level 326 in material cylinder 303 through the top outlet of material cylinder 303 through an open valve 313, tubing 327 and then into cylinder 301, with both valves 310 and 312 closed. The sequence for the opening and closing of the valves in FIGURE 13 to produce continuity of flow of material to spray gun 316 is similar to the operational sequence outlined for FIGURE 12. Furthermore, all other aspects outlined for FIGURE 12 are applicable for the spray unit shown in FIGURE 13, except that the unit in FIGURE 13 will not have available exhausted compressed gas for operation of auxiliary equipment and air controls. Obviously, since the compressed gas is never exhausted or wasted, continuity of flow of material to spray guns 316 can be assured as long as new material is available at the necessary high pressures at material supply line 315 for the refilling of material cylinder 302 and 303. One material supply source 315 can supply many spraying units such as shown in FIGURE 13, limited in number only by the capacity of material source 315 as compared to the rate of material use by the spray units.

Figures 14, 15:
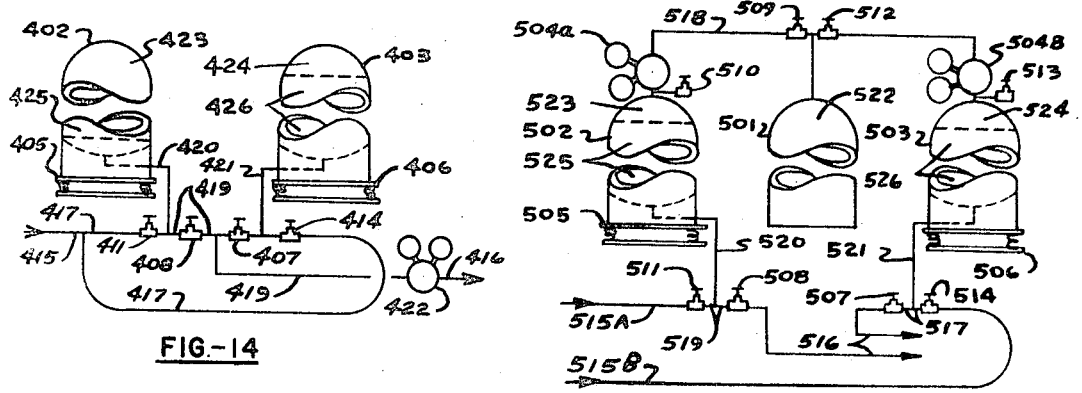
FIGURE 14 is a further modification of the continuous manual to fully automatic spraying unit of my invention.
FIGURE 15 is still another modification of the continuous manual to fully automatic spraying unit of my invention.

FIGURE 14 represents a continuous manual to fully automatic production type of spraying unit consisting of two high pressure cylinders 402 and 403, each of which contains, respectively, material to be sprayed 425 and 426 in bottom portion, and high pressure gas 423 and 424 in the upper portion. The compressed gas 423 and 424 which is "spent" in forcing the material 425 and 426 to the spray guns 416 is never exhausted or lost, but is repressurized in the same cylinder by the refilling of the cylinder from material supply line 415 which is under a high enough pressure to repressurize gas 423 and 424 to the required amount of pressure. The bottom outlet of each of the cylinders 402 and 403 is connected, respectively, by tubing 420 and 421 to tubing 417, respectively, through valves 411 and 414, which tubing 417 leads to material supply line 415. The bottom outlet of each of the cylinders 402 and 403 is connected, respectively, by tubing 420 and 421 to tubing 419 respectively, through valves 408 and 407, through material pressure regulator 422, and on to spray guns 416. Each of the cylinders 402 and 403 is setting on, respectively, level detecting devices 405 and 406 for determining the need for the beginning and the stopping of the material refilling operation for each of the cylinders 402 and 403. In the following operational procedure, it is assumed that the level detecting device 405 has just indicated that the level of material 425 in cylinder 402 has just reached the point at which the refilling of cylinder 402 with new material must be commenced. Up to and including this instant, the spray guns 416 were being fed material 425 out of cylinder 402 through tubing 420 and 419, through open valve 408, and pressure regulator 422; with valve 411 closed, valve 407 closed and valve 414 closed. Now, immediately before starting the refilling operation for cylinder 402, valve 407 is opened to start the feeding of material 426 out of cylinder 403 through tubing 421, through valve 407, through tubing 419, through material pressure regulator 422, and on to spray guns 416. Then, valve 408 is closed to stop the flow material 425 to the spray guns 416; open valve 411 to feed new material from material supply source 415 through tubing 417, valve 411, and tubing 420 to raise the level of material 425 in cylinder 402, which filling operation will continue until the level detecting device 405 indicates that material 425 has reached the maximum permissable level of filling in cylinder 402; at this instant, valve 411 is closed to stop further flow from the material supply line 415 into cylinder 402; now, cylinder 402 will be ready for reuse, and when level detecting device 406 indicates that the level of material 426 has reached the low level which indicates the need for refilling of cylinder 403, a similar opening and closing of valves will follow as outlined above for the refilling of cylinder 402; that is, open valve 408, close valve 407, open valve 414, and when level detecting device 406 indicates cylinder 403 is filled to the proper level with material 426, then close valve 414. The spraying unit is now in the starting position. The entire spraying unit in this FIGURE 14 can be either completely manually operated to offer continuity of flow of material to the spray guns 416; part manually and part automatically; or completely automatic by the use of automatically controlled valves sequentially opened and closed by electrical impulses, relayed by the level detecting devices 405 and 406; or all the automatic controls and valves may be pneumatic; or complete automation can be arranged by a combination of pneumatic and electric controls. With this unit, continuity of flow to spray guns 416 is assured as long as new material is supplied to the system through material supply line 415 at the necessary high pressures. One material supply source 415, can supply many spraying units such as shown in FIGURE 14, limited in number only by the capacity of material source 415 as compared to the rate of material use by the spray units.

FIGURE 15 illustrates still another form of continuous manual to fully automatic production type of spraying and pouring unit for the application of multiple component materials such as epoxy and polyurathane foam, in which the "spent" compressed gas is either exhausted or used for the delivery of the new material components to the unit through low pressure material supply lines. This unit in FIGURE 15 consists of a high pressure cylinder 501 containing only high pressure gas 522, connected to the top inlet of high pressure material cylinders 502 and 503, by way of tubing 518, and respectively, through valves 509 and 512, and pressure regulators 4A and 4B. Each of the material cylinders 502 and 503 contains, respectively, material component 525 and material component 526 in the lower portion and regulated compressed gas 523 and 524 in the upper portion. The bottom outlet of material cylinder 502 is connected by tubing 520, tubing 519, and through valve 508 to mixing head 516 for delivery of component material 525. The bottom outlet of material cylinder 503 is connected by tubing 521, tubing 517, and through valve 507, to mixing head 516 for delivery of component material 526. The bottom outlet of cylinder 502 is also connected to the material source line 15A for material component 525 by way of tubing 520, tubing 519, and through valve 511; and the bottom outlet of cylinder 503 is also connected to the material source line 15B for material component 526 by way of tubing 521, tubing 517, and through valve 514. Material cylinders 502 and 503 are setting on level detecting devices, respectively, 505 and 506. The purpose of these devices is to determine the need for the beginning and the stopping of the refilling operation for each of the material cylinders 502 and 503. Valves 510 and 513 connected, respectively, to the top outlets of material cylinders 502 and 503 serve the purpose of exhausting the "spent" compressed gas, respectively, 523 and 524 before the material refilling operation can be commenced for each of the material cylinders 502 and 503. In the following operational procedure, it is assumed that the ratio of the component mix of material 525 and 526 required for delivery to mixing head 516 is 1 to 1, that is, the same amount of material 525 is used as material 526. It is further assumed that the level detecting devices 505 and 506 have just indicated that the level of materials 525 and 526 in material cylinders 502 and 503 has just reached the point at which the refilling of material cylinders 502 and 503 must be commenced. Up to and including this instance, the mixing head 516 was being fed material 525 out of cylinder 502 through tubing 520 and 519 and open valve 508 and also material 526 out of material cylinder 503 through tubing 521 and 517 and open valve 507; with valves 510 and 513 closed, valves 509 and 512 open, and valves 511 and 514 closed. With the unit shown in this FIGURE 15 the delivery of the two component materials to mixing head 516 must be stopped during the refilling of cylinders 502 and 503. Now, to start the refilling operation, close valves 508 and 507; close valves 509 and 512; open valves 510 and 513 to permit the exhausting of the "spent" gas 523 and 524 out of cylinders 502 and 503; open valve 511 to feed new material 525 from material source 15A through valve 511, through tubing 519 and 520 and thus into cylinder 502, simultaneously opening valve 514 to feed new material 526 from material source 15B through valve 514, through tubing 517 and 521 and thus into cylinder 503. This filling operation will continue until the level detecting devices 505 and 506 indicate that the materials 525 and 526 have reached the maximum permissible level of filling in cylinders 502 and 503; at this instant, valves 511 and 514 are closed to stop further flow from the material supply lines 15A and 15B into cylinders 502 and 503; valves 510 and 513 are closed to prevent the further exhausting of gas 523 and 524 out of cylinders 502 and 503; valves 509 and 512 are opened to permit the passage of compressed gas 522 through pressure regulators 4A and 4B, and on into the top of material cylinders 502 and 503, so that material cylinders 502 and 503 are ready for use filled with materials 525 and 526 and pressurized with regulated gas 523 and 524. Now, the delivery of the two component materials 525 and 526 can again be commenced by the opening of valves 508 and 507. This flow of material to mixing head 516 will continue until again the level detecting devices 505 and 606 indicate the need for the starting of another refilling cycle as outlined above. If the ratio of mix for components 525 and 526 varies, then the refilling cycle for each material cylinder would not necessarily take place at the same time. Some flexibility in this respect can be arranged by having the ratio of the volume of the cylinders 502 and 503 correspond to a reasonable extent, to the ratio of mix of materials 525 and 526. Continued uninterrupted delivery of component materials 525 and 526 can be obtained by adding one additional material cylinder tied in series to each of the material cylinders 502 and 503, in FIGURE 15, with the necessary additional valving, tubing, pressure regulators, and level detecting devices. This can best be simply explained by visualizing a unit similar to the spray unit in FIGURE 12 being provided for delivery of each component to the mixing head. Furthermore, all other aspects outlined for the unit in FIGURE 12 are applicable for the unit shown in FIGURE 15; and the unit in FIGURE 15 can be further modified to take advantage of the applicable and desirable features of the unit in FIGURE 13 by adding two additional material cylinders with the necessary tubing, valving, pressure regulators, and level detecting devices; and the unit in FIGURE 15 can also be modified to take advantage of the applicable and desirable features of the unit in FIGURE 14 by adding two additional cylinders with the necessary tubing, valving, pressure regulators, and level detecting devices.

The following represent general as well as specific advantages that are to be gained by the use of my invention in lieu of present methods for the airless spray application of paints, coatings, and other sprayable materials, as well as the delivery of multiple component materials to a mixing gun for spraying or pouring:

(1) There is no pulsation of the material at the spray nozzle as presently experienced by the use of hydraulic type material pumps created by the pump stroke;

(2) Inexpensive, trouble-free material delivery as compared to present complicated and costly hydraulic pumping units;

(3) No mechanical moving parts as in presently used equipment, which makes my invention particularly advantageous for the high pressure airless spraying of paint and other materials, all of which are abrasive in varying degrees and destructive to mechanical moving parts;

(4) Since my invention does not involve any pumping action on the materials to be sprayed there is no change in the characteristic of the material as presently caused by the pumping action and recirculation of the paint through the pump when it is not being sprayed which affects the grind of the pigments, may result in different appearance after spraying for some materials, and also creates loss of solvents with resulting and undesirable change in paint viscosities;

(5) Completely noiseless as compared to high level noise of present pumping equipment;

(6) Since each individual unit may be self-contained for each painter, a very short length of hose is used as compared to long hoses now used to remotely located bulky and heavy pumping equipment. Short hoses over long hoses offer not only a saving in the cost of hose and the difficulty of handling long hoses, but also require less pressure at the material source because of lower frictional losses through the shorter hoses;

(7) More uniform pressure without pulsations for proper and better control of material application;

(8) Since the material is contained in sealed high pressure cylinders it would be difficult or impossible to adulterate the material accidentally or intentionally, or for any foreign material such as dirt and dust to get into the cylinder to cause the clogging of the very small nozzles used in airless spraying;

(9) There is no need for a material filter between the tank and the application gun since the material can be pre-filtered before it is injected into the high pressure material cylinder, after which it cannot be contaminated;

(10) Since the material is contained in sealed containers, there is far less fire hazard than offered by use of present equipment using open containers;

(11) Since the basic concept and embodiments of my invention require no moving parts, the useful life of each unit is unlimited if taken care of against corrosion or extremely hard abuse.

It will be apparent from my disclosure that liquid gases or solid gases may be used as a source of high pressure fluid. For example, carbon dioxide ice (Dry Ice) may be placed in a containing vessel and used as a source of fluid. This permits the apparatus to be utilized with ordinary carbon dioxide ice without need to obtain a cylinder of liquefied gas or high pressure gas.

I claim:

1. A high pressure spray apparatus comprising a pressure vessel, an outlet in said pressure vessel communicating with the lowest point in said pressure vessel, a spray nozzle connected to said outlet, a liquid suspension of material to be sprayed within said pressure vessel, a high pressure compressible immiscible fluid in contact with the liquid suspension and means for replacing said liquid suspension to be sprayed without loss of said high pressure fluid.

2. An apparatus as claimed in claim 1 wherein the high pressure fluid exceeds 500 p.s.i.

3. An apparatus as claimed in claim 1 wherein the high pressure fluid and material to be sprayed are contained within the same pressure vessel.

4. An apparatus as claimed in claim 1 wherein the high pressure fluid and the material to be sprayed are contained within separate vessels connected by conduit means.

5. An apparatus as claimed in claim 1 wherein a second pressure vessel containing the high pressure compressible fluid is connected to said pressure vessel containing material to be sprayed above the liquid suspension to be sprayed and means are provided for selective communication between said vessel containing high pressure fluid and said vessels containing liquid suspension.

6. An apparatus as claimed in claim 5 wherein more than one of said pressure vessels containing suspension to be sprayed are connected simultaneously to said pressure vessel containing high pressure compressible fluid.

7. An apparatus as claimed in claim 1 having level indicating means indicating the amount of liquid suspension in the pressure vessel.

8. An apparatus as claimed in claim 5 having level indicating means on the pressure vessel containing liquid suspension to be sprayed indicating the amount of liquid suspension in the pressure vessel.

References Cited

UNITED STATES PATENTS

| | | | |
|---|---|---|---|
| 3,035,522 | 5/1962 | Lung | 137—209 X |
| 3,297,257 | 1/1967 | Roser | 239—373 X |
| 888,693 | 5/1908 | Bustinza | 239—305 |
| 2,976,897 | 3/1961 | Beckworth | 222—399 X |

M. HENSON WOOD, Jr., Primary Examiner

M. Y. MAR, Assistant Examiner

U.S. Cl. X.R.

137—210; 222—399; 239—308, 373